US012664597B2

(12) United States Patent (10) Patent No.: US 12,664,597 B2
Oks et al. (45) Date of Patent: Jun. 23, 2026

(54) EXTENDED REALITY FOR ENHANCED INTERACTIVE LAND VISUALIZATION

(71) Applicant: Inventus Holdings, LLC, Juno Beach, FL (US)

(72) Inventors: Lawrence J. Oks, Palm Beach Gardens, FL (US); Quazi A. Caesar, Miami, FL (US); Kyle A Bush, Palm Beach Gardens, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 4 days.

(21) Appl. No.: 18/667,235

(22) Filed: May 17, 2024

(65) Prior Publication Data

US 2025/0356441 A1 Nov. 20, 2025

(51) Int. Cl.
| *G06Q 30/00* | (2023.01) |
| *G06Q 30/02* | (2023.01) |
| *G06Q 30/0601* | (2023.01) |
| *G06Q 50/16* | (2012.01) |
| *G06T 19/00* | (2011.01) |
| *G06F 3/04817* | (2022.01) |

(52) U.S. Cl.
CPC ......... *G06Q 50/16* (2013.01); *G06Q 30/0278* (2013.01); *G06Q 30/0643* (2013.01); *G06T 19/006* (2013.01); *G06F 3/04817* (2013.01); *G06T 2200/24* (2013.01); *G06T 2210/56* (2013.01)

(58) Field of Classification Search
CPC .............. G06Q 50/16; G06Q 30/0278; G06Q 30/0643; G06Q 30/0641; G06Q 30/06431; G06Q 30/06432; G06Q 30/06433; G06Q 30/06434; G06Q 30/06435; G06Q 30/0644; G06Q 30/06442; G06Q 30/06443; G06Q 30/06444; G06T 19/006; G06T 2200/24; G06T 2210/56; G06F 3/04817
USPC ...................................................... 705/26, 27
See application file for complete search history.

(56) References Cited

U.S. PATENT DOCUMENTS

| 7,228,235 B2 | 6/2007 | Grzych et al. |
| 7,640,204 B2 | 12/2009 | Florance et al. |
| 8,977,558 B2 | 3/2015 | Nielsen et al. |
| 9,552,669 B2 | 1/2017 | Wallbom et al. |

(Continued)

FOREIGN PATENT DOCUMENTS

| WO | 2022/232605 | 11/2022 |

OTHER PUBLICATIONS

Clifford, D.; Reid, M. (Oct. 23, 2023). Why real estate businesses should care about the metaverse. Pinsent Masons. https://www.pinsentmasons.com/out-law/analysis/real-estate-businesses-metaverse.

(Continued)

*Primary Examiner* — Robert M Pond
(74) *Attorney, Agent, or Firm* — TROUTMAN PEPPER LOCKE LLP; Dustin B. Weeks

(57) ABSTRACT

A method and system for new property acquisition process for utilities. The process uses preprogrammed virtual reality headsets to provide property owners with a virtual reality (VR) social platform, such as a metaverse-enabled presentation, showing projects, answering questions, and delivering individualized property rights acquisition proposals. The invention enhances the property owner's presentation and enables significant scaling without significant headcount growth.

20 Claims, 6 Drawing Sheets

(56) References Cited

U.S. PATENT DOCUMENTS

| | | | |
|---|---|---|---|
| 9,646,353 B2 | 5/2017 | Nielsen et al. | |
| 10,242,499 B2 | 3/2019 | Bryson et al. | |
| 10,248,744 B2 | 4/2019 | Schissler et al. | |
| 10,740,502 B2 | 8/2020 | Duff et al. | |
| 10,909,276 B2 | 2/2021 | Wayne et al. | |
| 11,017,485 B2 | 5/2021 | Riland et al. | |
| 11,120,515 B1 | 9/2021 | Bhatia et al. | |
| 11,184,304 B2 | 11/2021 | Goenka et al. | |
| 11,480,791 B2 | 10/2022 | Berliner et al. | |
| 11,494,530 B2 | 11/2022 | Bieganek et al. | |
| 11,522,945 B2 | 12/2022 | Rafkind et al. | |
| 11,593,538 B2 | 2/2023 | Procaccioli et al. | |
| 11,615,489 B2 | 3/2023 | Jung | |
| 11,640,697 B2 | 5/2023 | Eathakota et al. | |
| 11,651,561 B2 | 5/2023 | Mccall | |
| 11,663,685 B2 | 5/2023 | Yerli | |
| 11,741,677 B1 | 8/2023 | Chavez et al. | |
| 2012/0237085 A1* | 9/2012 | Meier | G06V 10/768 |
| | | | 382/103 |
| 2016/0027051 A1* | 1/2016 | Gross | G06V 20/20 |
| | | | 705/14.54 |
| 2016/0371801 A1* | 12/2016 | Dawson | G06F 16/29 |
| 2017/0153866 A1* | 6/2017 | Grinberg | H04S 7/302 |
| 2018/0159838 A1 | 6/2018 | Dintenfass | |
| 2020/0043110 A1* | 2/2020 | Kalyanasundaram | |
| | | | G06Q 50/16 |
| 2025/0217527 A1* | 7/2025 | Sherer, IV | B60L 53/51 |

OTHER PUBLICATIONS

Felli, Franco & Liu, Chang & Ullah, Fahim & Sepasgozar, Samad. (2018). Implementation of 360 videos and mobile laser measurement technologies for immersive visualisation of real estate & properties.

Guarnera, C. (Jan. 8, 2024). Selling Homes in a Snap: The Power of Drone Photogrammetry in Real Estate. Blue Falcon Aerial. https://www.bluefalconaerial.com/selling-homes-in-a-snap-the-power-of-drone-photogrammetry-in-real-estate/.

Hong, J. Y., Lam, B., Ong, Z. T., Ooi, K., Gan, W. S., Kang, J., Yeong, S., Lee, I., & Tan, S. T. (2021). A mixed-reality approach to soundscape assessment of outdoor urban environments augmented with natural sounds. Building and Environment, 194, 107688. https://doi.org/10.1016/j.buildenv.2021.107688.

McKinnon, A. (2021, Aug. 11). Wind Turbines: Virtual Reality and Augmented Reality Presentations for Sales, Demos, and Engineering. AfterNow: Mixed Reality. https://www.afternow.io/wind-turbines-virtual-reality-and-augmented-reality-presentations-for-sales-demos-and-engineering/.

Dhoot, Aditya & Antonini, Enrico G.A. & Romero, David A. & Amon, Cristina H., 2021. "Optimizing wind farms layouts for maximum energy production using probabilistic inference: Benchmarking reveals superior computational efficiency and scalability," Energy, Elsevier, vol. 223(C). https://arxiv.org/pdf/2102.08479.pdf.

Stephenheidelberg, & Stephenheidelberg. (Aug. 2, 2021). GIS Visualization and Storytelling In 3D. ArcGIS Blog. https://www.esri.com/arcgis-blog/products/arcgis/3d-gis/gis-visualization-and-storytelling-in-3d/.

* cited by examiner

GIS Property
Characterstics

PoV Selectors 1st PoV     FIG. 1

3rd POV
Solar, Storage, Control
Room Building, Wind

2nd POV
Wind and Solar and
Control Room Building

4th PoV
Street View

5th PoV FIG. 6

6th PoV
Control Room
Building, Wind

7th PoV
Solar, Storage, Control
Room Building, Wind

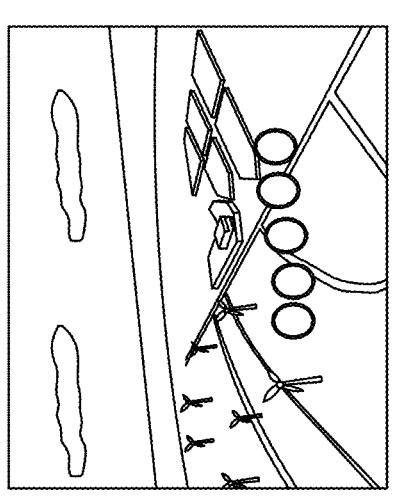
8th PoV
Solar, Storage, Control Room
Building, Wind
FIG. 9
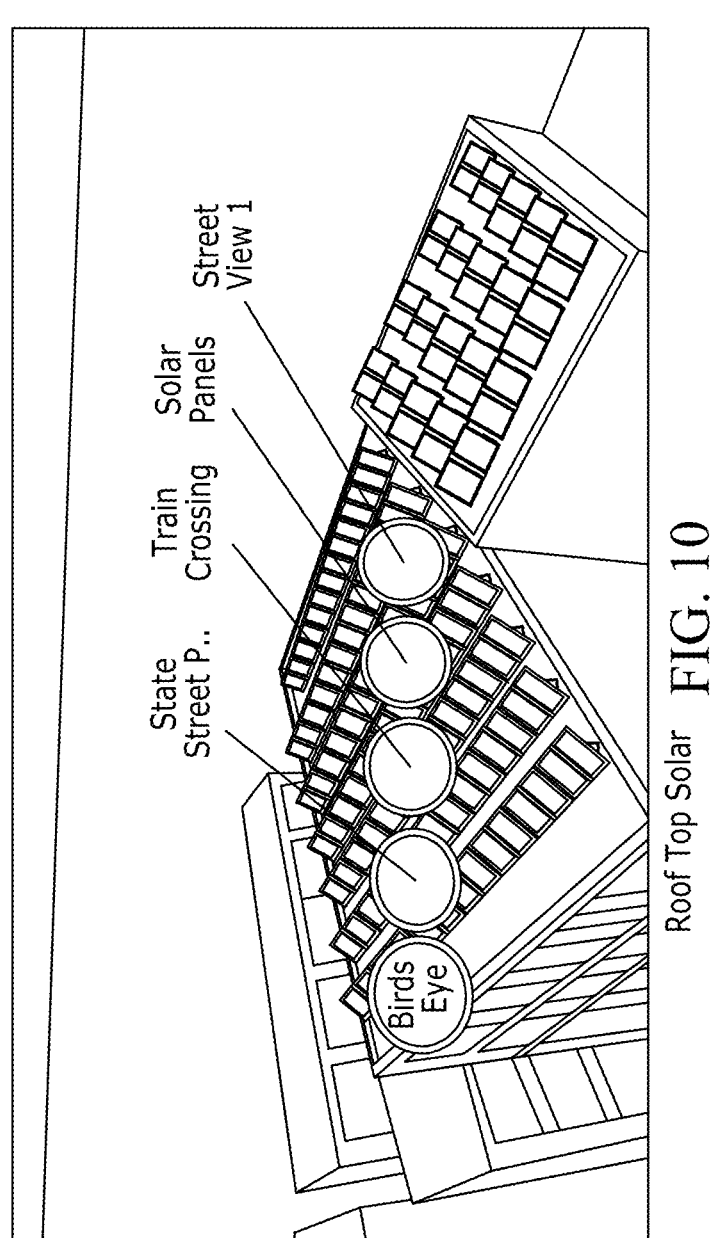
Roof Top Solar   FIG. 10

| Alternative Land use compatibility examples for common installations | | | | |
|---|---|---|---|---|
| SOLAR | Agrivoltaic / Dual-use farming (shade tolerant crops such as tomatoes) | Livestock/Farming (chicken farming, sheep grazing) | Bee Pollinator Gardens | Landfills, Brownfields, retired mines |
| WIND | Livestock Grazing | Crops | Wildlife habitats | Recreational use (biking, hiking, etc.) |

EXTENDED REALITY FOR ENHANCED INTERACTIVE LAND VISUALIZATION

FIELD OF THE DISCLOSURE

The present disclosure generally relates to extended reality platforms and, more particularly, interactive, immersive technologies to review select parcels of land for projects, such as renewable energy projects.

BACKGROUND

Advances in 3-D imaging and immersive Reality have reduced the use of paper maps, 2D imagery, and graphs. Immersive Reality enables the presentation of data required to enhance understanding of various projects.

Developers for utilities often need to buy or lease property rights and/or property rights to place various infrastructure equipment. This infrastructure equipment may be buried underground or placed above ground. Examples of buried infrastructure equipment include electric power, water, sewer, gas, cable, and fiber. Examples of above-ground infrastructure include overhead lines such as power, Internet, cable TV, fiber, antennas, transformers, substations, and more. Property rights may include installing solar panels on the roof of a residential or commercial building.

Acquiring the necessary property rights for larger infrastructure projects like renewable energy sites is even more of a challenge. A significant amount of time and effort goes into acquiring the necessary property rights. Developers often have multiple meetings with various property owners, including neighboring property owners and local governments. This costs thousands of dollars in multiple days of travel, food, lodging, and car rentals. Additionally, developers can be limited in their sales pitch, often using 2-D maps and photographs to get their point(s) across.

In addition to buying and leasing land from landowners across the country for renewable energy projects, other types of developers, e.g., commercial and residential, desire to understand geographic characteristics and other information about a given piece of land.

Data visualization and interactivity in the future relates to the energy industry for both internal employees and external customers or community members.

SUMMARY OF THE INVENTION

A method and system for new property acquisition process for utilities. The process uses preprogrammed virtual reality headsets to provide property owners with a virtual reality (VR) social platform, such as a metaverse-enabled presentation, showing projects, answering questions, and delivering individualized property rights acquisition proposals. The invention enhances the property owner's presentation and enables significant scaling without significant headcount growth.

More specifically, disclosed is a system and computer-implemented method for performing an interactive property use assessment. The method begins with accessing an image of a real-world space with an associated property owner. The image may include accessing at a real-world image, a virtual image, or a combination thereof. The real-world space may include a 2-D image, a 3-D image from LiDAR, photogrammetry stitching, or the generation of a point cloud.

Next, input is received from a user to select pieces of infrastructure equipment to be rendered in the real-world space. An image of the pieces of infrastructure equipment is accessed. An extended reality is created by combining i) the image of real-world space with ii) the image of pieces of infrastructure equipment.

Next, a financial value is calculated to offer the property owner based on pieces of infrastructure equipment shown in the virtual reality image. The financial value that has been calculated may be a lease value to offer the property owner, a purchase value to offer the property owner or both.

A user selects a graphical widget. In response to receiving the user selection of one of the plurality of graphical widgets, presenting to the user the virtual reality image with the financial value that has been calculated.

The graphical widget may further include selecting a time of day and a date and calculating the position of the sun to present as part of the graphical widget to include shadows. In addition, the graphical widgets may represent a type of electricity generation technology, and selecting the graphical widgets presents the type of electricity generation technology. Further, in another example, the graphical widgets represent a type of "GIS (geographic information system) data and the graphical widget further includes presenting the type of GIS data selected.

In another example, the presenting to the user the virtual reality image from the graphical widget further includes generating audio associated with the pieces of infrastructure equipment is operating in which the audio has been spatially matched to the graphical widget to account for a distance from the pieces of infrastructure equipment. The audio is presented to the user that has been generated. For example, the infrastructure equipment is a wind turbine with blades turning due to wind. In still another example, the generating audio further comprises generating audio associated with the operation of the pieces of infrastructure equipment in which the audio has been spatially matched to the point of view to account for objects between the pieces of infrastructure equipment and the graphical widget. The objects between the pieces of infrastructure equipment and the graphical widget may be trees, walls of structures, and property details. The generating audio may further comprise generating audio associated with the operation of the infrastructure equipment in which the audio has been spatially matched to a time of day, a time of year, a temperature, humidity, or a combination thereof.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 1 illustrates an extended reality image of a selected parcel of land illustrating a plurality of user-selectable points-of-view (PoV) icons, according to an example;

FIG. 6 illustrates an extended reality image of a selected parcel of land at another selected PoV with wind and solar infrastructure of FIG. 3, according to an example;

FIG. 9 illustrates an extended reality image of a selected parcel of land at another selected PoV with wind and solar infrastructure of FIG. 3, according to an example;

FIG. 10 illustrates an extended reality image of a selected building at a selected POV with solar infrastructure illustrating a plurality of user-selectable PoV icons, according to an example;

DETAILED DESCRIPTION

Figures 2, 3, 4:
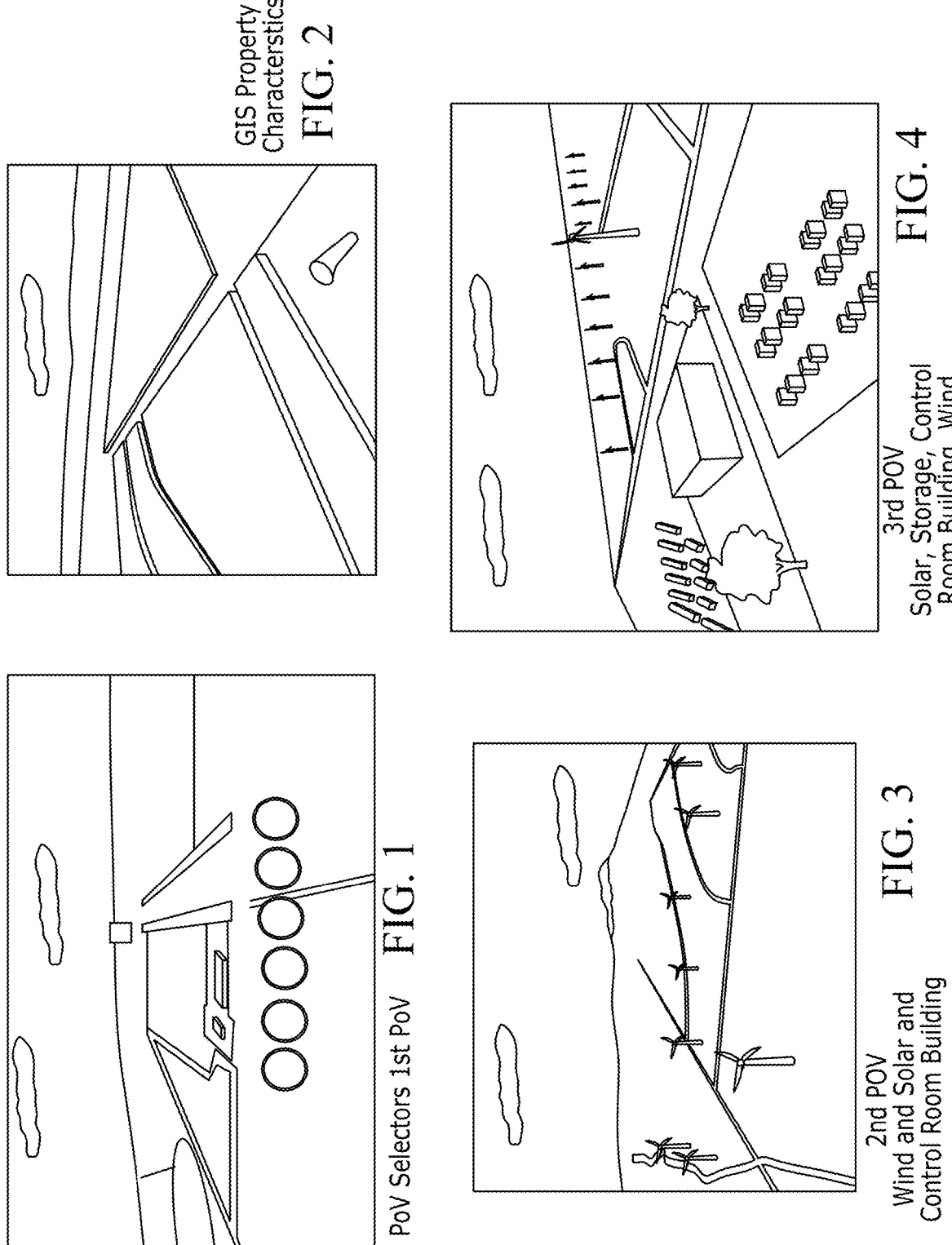
FIG. 2 illustrates an extended reality image of a selected parcel of land illustrating a geographic information system (GIS) property characteristic overlay, according to an example.
FIG. 3 illustrates an extended reality image of a selected parcel of land at another selected PoV with wind and solar infrastructure, according to an example.
FIG. 4 illustrates an extended reality image of a selected parcel of land at another selected PoV with wind and solar infrastructure of FIG. 3, from a different POV with additional infrastructure, according to an example.
Figures 5, 7, 8:
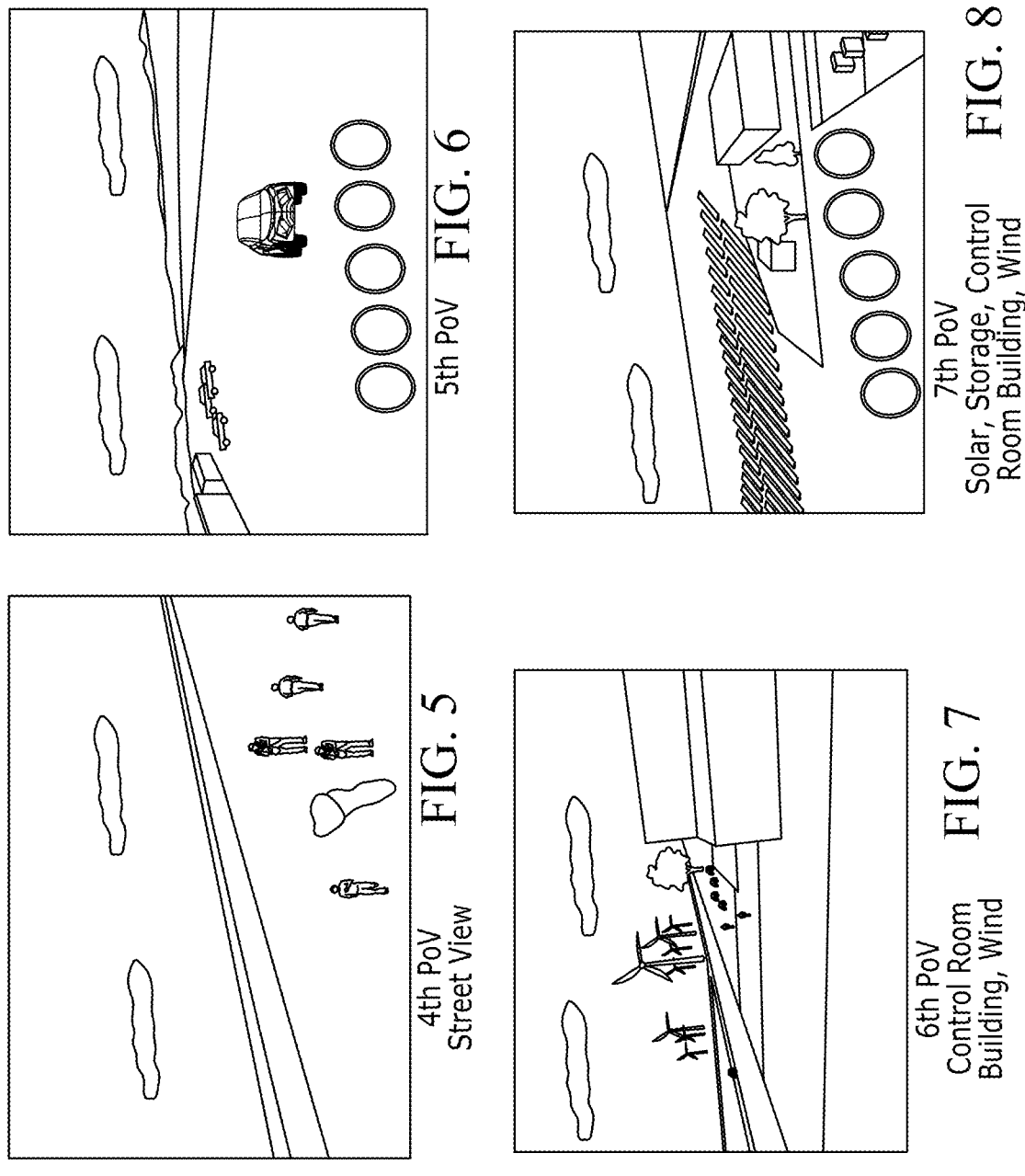
FIG. 5 illustrates an extended reality image of a selected parcel of land at a selected PoV of a street view with wind and solar infrastructure of FIG. 3, according to an example.
FIG. 7 illustrates an extended reality image of a selected parcel of land at another selected PoV with wind and solar infrastructure of FIG. 3, according to an example.
FIG. 8 illustrates an extended reality image of a selected parcel of land at another selected PoV with wind and solar infrastructure of FIG. 3, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather to provide an understandable description.

Non-Limiting Definitions

The term "3-D measurements" refers to measurements, typically non-contact measurements, taken of an object to create a 3-D point cloud of an object that is dimensionally accurate and a photorealistic model of the object, such as through photogrammetry.

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "configured to" describes hardware, software or a combination of hardware and software that is adapted to, set up, arranged, built, composed, constructed, designed, or that has any combination of these characteristics to carry out a given function.

The terms "camera" and "displays" are terms of convenience but do nevertheless describe an ordinary cell phone. A camera can be expanded to include any form of directional identification of the appliance-Optics, LiDAR, RFID, NFC, etc. and the display can be a cell phone with or without displaying augmentation of the appliance or a hand-held or head-worn stereoscopic display. Also, the information displayed can include both smart meter and cloud-based appliance information.

The term "computer-generated image" means image content brought into a real-world image to augment it.

The term "coupled," as used herein, is defined as "connected," although not necessarily directly and not necessarily mechanically.

The term "extended reality" is an umbrella term for all immersive technologies, including augmented Reality (AR), virtual Reality (VR), and mixed Reality (MR).

The term "GIS (geographic information system) data" includes data for a given geographical region, including roads, utilities, storm drains, property boundaries, building data, topographical information, vegetation data including soil, weather patterns, data about inhabitants including income and education level.

The term "graphical widget" is an element of a graphical author interface that displays information or provides a specific way for an author to interact with the operating system (OS) or an application. Widgets include the following: icons, pull-down menus, buttons, selection boxes, progress indicators, on-off checkmarks, scroll bars, windows, window edges that let you resize the window; toggle buttons; and devices for displaying information and inviting, accepting, and responding to author actions. One example of a graphical widget is a point-of-view (PoV) icon.

The terms "including" and "having," as used herein, are defined as comprising (i.e., open language).

The term "image" refers to a spatial pattern of physical light comprised of known colors of the light spectrum, which may or may not be visible to the human eye. The term image includes both real-world images, such as a live view through a camera, as well as a virtual representation of a space.

The term "image editing software" means software for editing and manipulating images, such as, Blender.org or Photoshop from Adobe.

The term "infrastructure equipment" means equipment utilities use to generate and deliver utility-related services, including power, Internet, cable, phone, water, sewer, and natural gas.

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "photogrammetry" is a technique to extract three-dimensional measurements of an object to obtain reliable information, such as three-dimensional measurements, through processing and interpreting a series of photographic images. Photogrammetry may be complemented by techniques like LiDAR, laser scanners (using time of flight, triangulation, or interferometry), white-light digitizers, and any other technique that scans an area and returns x, y, z coordinates for multiple discrete points, commonly called "point clouds".

The term "procedural modeling" is an umbrella term for a number of techniques in computer graphics to create 3D models and textures from sets of rules. L-Systems, fractals, and generative modeling are procedural modeling techniques since they apply algorithms to produce scenes.

The term "property owner" means a person or persons, including business entities, that owns the rights to developed or undeveloped property, which may include a structure on the property, including buildings and homes.

The term "real-world" means existing in Reality, as opposed to one that is virtual, imaginary, simulated, theoretical or a computer-generated image.

The term "synthetic" means creating a computer-generated composite image combining computer-generated images with real-world images.

The term "variable attributes" means a changeable characteristic of a specific object in a family of objects that may be different from other objects in the same family of objects.

The term "uniform data format" means data in a given format, whether date format, time format, currency format, scientific format, text format, or fractional format, so that all values of data are presented in a single consistent format for a given category or criteria.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Overview

Disclosed is a method and system to include a new property acquisition process for utilities. The process uses preprogrammed virtual reality headsets to provide property owners with a virtual reality (VR) social platform, such as a metaverse-enabled presentation, showing projects, answering questions, and delivering individualized property rights acquisition proposals. The invention enhances the property owner's presentation and enables significant scaling without significant headcount growth.

Broadly, the solution reimagines the sale experience for developers acquiring property from property owners. This is done by bringing the process into the metaverse, which, regardless of the device used (VR headset, smartphone, laptop, etc.), brings the following benefits:

Scalability. Rather than only being able to fly out to a single property owner's location every few days, developers could visit multiple property owners per day in a virtual environment. The present invention enables engagement with more customers with the same workforce in less time.

Cost savings. Instead of thousands of dollars in travel expenses, lodging, food, car rentals, and travel time, buying and shipping a VR headset to a potential property owner costs a few hundred dollars.

Enhanced storytelling and visualization tools. Virtual/shared/collaborative environments, 3D models, personalized 3D avatars with facial movements, and personable interaction mean developers are better equipped to reach agreements with the property owners and the communities and to reach the finish line and get "faster to yes."

The potential to provide an alternative to the current business model. Currently, developers spend time and resources identifying potential property to acquire rights needed to build infrastructure, including building renewable sites. Developers are able to place a virtual store with virtual walking tours in the metaverse where property owners can offer to sell or lease their property for a specific project.

Scenario Modeling] interactively and immersively adjust conditions or configure situations to observe their effects in real-time. These scenarios/outcomes can be refinanced, operational, environmental, risk, and more.

Analytics and measurement] analytics tools such as distance measurement, elevation profiling, solar irradiance calculators, and more.

Narratives and Tours: guided tours and narration through the generated virtual environment, highlighting significant features or content depending on the nature of content/application. For an engineering class, for example, this could be used to demonstrate visually and interactively how a steam turbine generator produces electricity through the process of hydrogen production with electrolysis.

The present invention allows users to visualize energy-related content, for example, content that lets a user walk around a 3D rendering of a power plant or construction workers to visualize what a solar site they want to build will look like.

In addition, the claimed invention provides a visualization of the construction of renewable infrastructure over time. Providing scenario modeling of financial, operational, environmental, risk, and more. Simulate events and situations, such as weather conditions and sunlight as it moves throughout the day, to explore solar panel efficiency and the effects of shading. Exploring alternative land uses constructed in conjunction with renewable infrastructure. Assisting with community outreach: visual demonstrations of how power generation, storage, and transmission work; storytelling on the benefits of renewable energy and its impact on the environment; Projected job creation from renewable infrastructure, and more.

High-Level Approach

At a high level, the invention describes the process to automatically generate energy content for an extended reality device provided with a piece of land and options as follows:

Designate a piece of land

Prepare and integrate relevant geographic information for a user to configure and interact with Visualize energy infrastructure and other installations that are procedurally generated based on insights and calculations performed in the previous steps, including limited to wind, solar, storage, hydrogen, and alternative land uses Overlay relevant data visualizations, such as financial projections, immersive visual demonstrations, etc., depending on the use case.

Generate Interactive Content that the user can configure or adjust with real-time implications and outcomes.

Export to an extended reality platform that is readily available to a user.

Tools Used

The following tools are listed on the information disclosure statement, and the teachings are incorporated in their entirety by reference.

GIS tools also exist that allow users to visualize GIS layers atop 3d renderings of land. see tools like Esri's ArcGIS (<https://www.esri.com/arcgis-blog/products/arcgigis/gis-visualization-and-storytelling-in-3D>).

ArcGIS also includes tools that allow users to select a piece of land (similar to a photo editor's "crop" feature) to designate the land that will be the focus of the site.

The land layers and other data that would be used as part of this invention also already exist, either generated internally by the applicant or taken from external sources of public weather data.

The algorithm that would be used to determine optimal site layout, likely a combination of external and internal algorithms that have been refined over such an example, is the patent filing U.S. Pat. No. 11,494,530B2.

Extended Reality Examples

FIG. 1 through FIG. 10 illustrates an extended reality image of a selected parcel of land. In this example, the interactive property use assessment includes accessing at least one image of a real-world space with an associated property owner. Next, input from a user to select one or more pieces of infrastructure equipment to be rendered in the real-world space is selected. Next, at least one image of the pieces of infrastructure equipment is accessed. Next, an extended reality is created by combining i) the image of real-world space with ii) the image of the pieces of infrastructure equipment. At least one financial value to offer the property owner is calculated based on the pieces of infrastructure equipment shown in the virtual reality image. A user selection of one of a plurality of graphical widgets. In response to receiving the user selection of one of the plurality of point-of-view (PoV) icons in FIG. 1, FIG. 6, FIG. 9, and FIG. 10, the virtual reality image from the PoV, along with the financial value that has been calculated, is presented to the user.

Detailed Approach

Figure 11A:
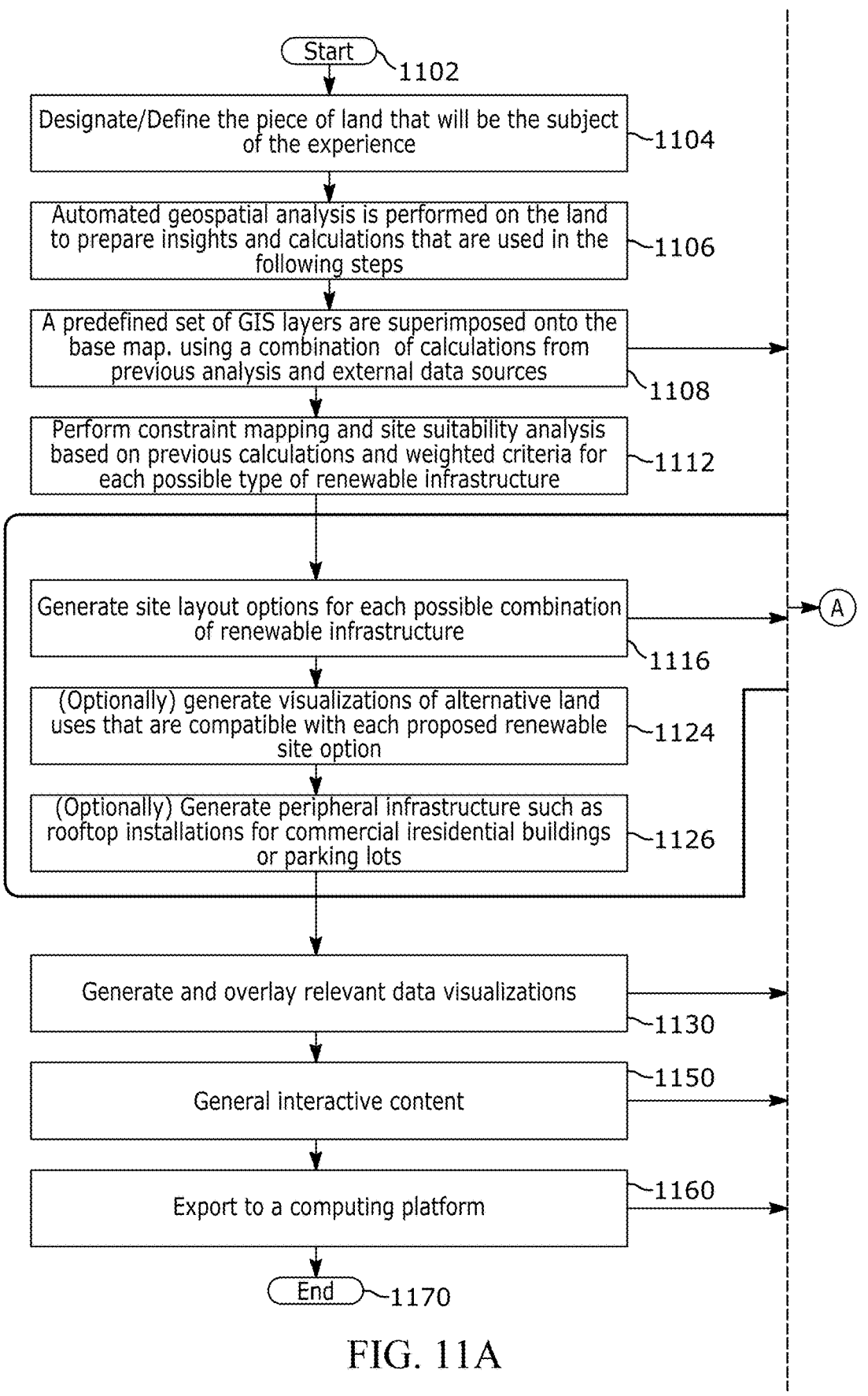
FIG. 11A through FIG. 11B is a flow diagram of the overall process for forming an extended reality environment, according to an example.
Figure 11B:
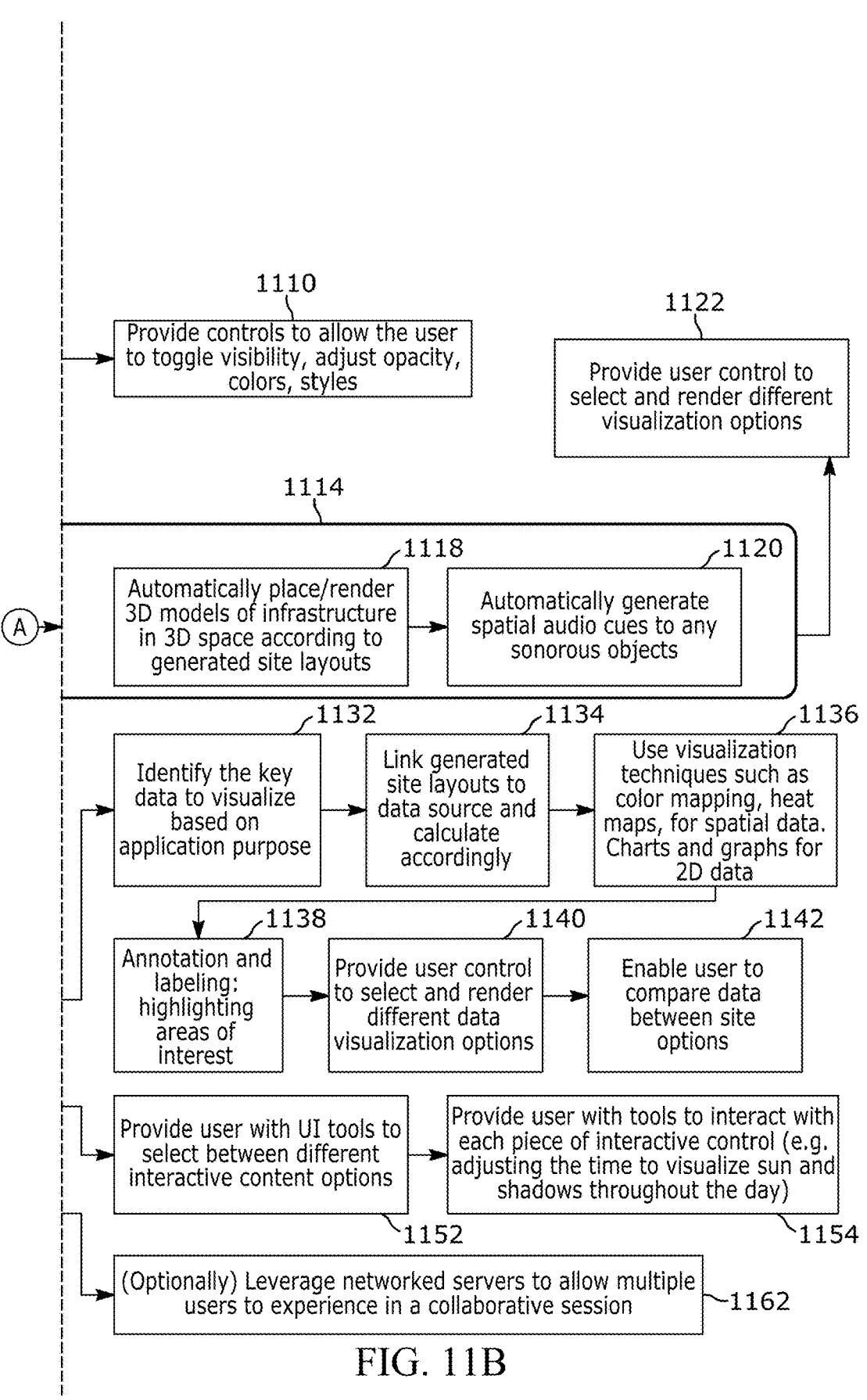

FIG. 11A through FIG. 11B is a flow diagram of the overall process for forming an extended reality environment. The process begins at step 1102 (Start) and immediately proceeds to step 1104. In step 1104 (Select Land), one or more parcels of land are selected by a user that will be the subject of the user experience. One example of the site is a renewable energy project. The land parcels that will be the focus of the site are selected. This may be done through satellite imagery, aerial footage, topographical maps, or other relevant geographical data. Next, the boundaries of the selected parcels is selected and logically "cut out" this parcel of land. This boundary selection may be achieved manually using the Geographic Information System's (GIS) editing tools, indicating the latitude and longitude coordinates that define the shape and boundaries of the land, or relying upon combinations of data sources, such as satellite imagery, land surveys, topographical, land use, and more, to algorithmically determine the appropriate boundaries. The process continues to step 1106.

In step 1106 (GIS Preparation), automated geospatial analysis is performed on the parcels of land selected by the user. In one example, the automated geospatial analysis is performed on the selected parcels of land to prepare further insights and calculations that will be used throughout the rest of the process, including slope analysis (slope, gradient, steepness of terrain). This will help determine optimal terrain for infrastructure installation, as flatter land is less costly and more accessible to develop. Also, aspect or exposure analysis is the compass direction or azimuth that a terrain surface faces. Aspect analysis is essential depending on the direction of the prevailing wind or the effect of solar energy production. Solar radiation analysis calculates the potential for solar energy production, considering various factors, such as slope, cloud coverage, latitude, elevation, shade from surrounding topography, vegetation, and more. Viewshed analysis may be performed to understand where wind turbines and other tall structures will be visible for community consultations and planning. Wind speed and direction analysis may be performed. Land cover analysis may be performed. Further, an analysis may include distance to transportation networks, including ship, rail, truck, and air, grid connection points, and distance to residential areas may be performed. Lastly, hydrology analysis to assess potential flooding risk. The process continues to step 1108.

In step 1108 (Integration of Relevant GIS layers), a predefined set of GIS layers may be superimposed onto the base map using a combination of calculations from step 1106 and other external data sources. Various GIS layers of data associated with the placement, financials, construction, operation, risk, and more of the infrastructure can be superimposed onto the base map to provide a comprehensive view of all relevant factors in the given geographical area. These layers included topographical, ground material, land use, existing infrastructure, environmental, regulatory, proximity, and weather data, including wind velocity, solar potential, and more. The users can interactively explore layers and metadata, clicking on specific features to view more details or adjusting the transparency of layers. The process continues to step 1110.

In step 1110 (Interactivity), the process interactively allows users to explore layers and metadata, clicking on specific features to view more details or adjusting the transparency of layers. User controls may be provided to enable the user to toggle the visibility of layers, adjust opacity, colors, highlight styles, and more. The process continues to step 1112.

In step 1112 (Constraint Mapping), constraint mapping and site-suitable analysis is performed. This, along with weighted criteria, produces optimal areas for each possible type of renewable infrastructure. For example, constraints based on the output from 1106 (Data Analysis), such as maximum slope allowed, are defined. Constraining surfaces/layers are created to exclude unsuitable areas for each infrastructure type. Here, the user is able to adjust constraint thresholds to their needs. Site suitability modeling combines constraint layers with this user-defined weighted criteria to produce outputs the user wants to optimize/maximize for, e.g., revenue MW generation capacity, minimize environmental impact. Ultimately, the site suitability analysis identifies optimal areas for each infrastructure type, e.g., Solar: high radiation, flat slopes, avoiding viewsheds, wind high wind speeds, flat/ridges, avoid densities. The process continues to generate 3D visualizations 1114 (Generate Visualization of Energy Infrastructure), which involves a series of related steps starting with step 1116.

In step 1116 (Generation of Layout Options), the layout of the site on the selected parcels of land is generated for each possible combination of renewable infrastructure. The system automatically places or renders 3D models of infrastructure in 3D space according to generated site layouts in step 1118. The following are examples of renewable infrastructure algorithms for wind, solar, battery, hydrogen, transmission, underground cable, and installing smart devices.

Turning to an example algorithm for wind, the optimal placement, angle, rotation, distance between structures, size, and more are determined algorithmically to maximize efficiency & simultaneously minimize cost & risk associated with development and operation. Renewable infrastructure, such as Wind Example Methodology, is described in Dhoot, Aditya & Antonini, Enrico G. A. & Romero, David A. & Amon, Cristina H., 2021. *"Optimizing wind farms layouts for maximum energy production using probabilistic inference: Benchmarking reveals superior computational efficiency and scalability,"* Energy, Elsevier, vol. 223(C). <https://arxiv.org/pdf/2102.08479.pdf.> which is listed on the information disclosure statement and the teachings of which are incorporated by reference in its entirety. Wind resource data is gathered for the given location over a short- and long-term period. These sets are combined to detect relationships and patterns in order to predict future meteorological conditions.

The wind farm terrain is discretized into grid cells, and each cell is represented as a mathematical decision variable, making it simpler to model the optimization problem. Based on this data, constraints are developed, including financial/budgetary, noise, spacing, terrain, and other infrastructure or environmental constraints. A wake model is used to estimate and minimize wake effects on the discretized wind farm terrain. Optimal turbine positions are determined using probabilistic inference models based on wake interactions and constraints.

Despite potentially not finding the mathematically optimal layout, this stochastic approach is preferred over a deterministic model as it generates optimal or near-optimal layouts that are much more computationally efficient. Potential Applications may include visualizing shadow flicker from turbines and/or visualizing turbine access roads and where they would be placed.

In the case of solar, an example method is described in U.S. Pat. No. 11,494,530B2 described previously above. Geographic map data is received comprising a map that defines geographic features and boundaries of a geographic region on which a solar farm is to be installed based on the solar farm design. Access a solar panel block library that is configured to store a plurality of virtual solar panel block types. Generate an array of virtual solar panel blocks comprising at least one of the plurality of virtual solar panel block types to fit within the geographic features and boundaries of the geographic region on the map based on the predetermined dimensions of each of the virtual solar panel blocks in the array. Iteratively modify the array to substantially optimize a predetermined criterion of the solar farm design. Store the solar farm design in memory for solar farm installation based on the solar farm design.

In the case of battery storage or other types of energy storage, while much simpler, considerations for layout optimization of battery storage compared to wind and solar include proximity to load served. Details on the terrain, e.g., flat and soil conditions.

Other types of land uses include hydrogen production and storage.

Transmission & distribution infrastructure may include pad mount transformers, power lines, distribution lines, undergrounding cable, fiber, and installing smart devices. The process continued to step 1120.

In step 1120 (Audio), the system may generate spatial audio cues for any sonorous objects that are related to the infrastructure installed spatially matched to the location of the user in 3D space and accounting for objects that may affect the audio within the 3D space. Automate the generation of audio cues related to the infrastructure installed. Spatially matched to the location of the user in 3D space. Accounting for objects that may affect the audio within the 3D space, such as buildings, trees, terrain, and other structures, agriculture, and animals such as sheep and bee pollinator gardens. The process continues to step 1124.

In step 1124, the visualization of the energy infrastructure and other installations is performed. There are two major cases. The first case is for constructing energy infrastructure on land. The second case is for constructing energy infrastructure to be compatible with a given installation, such as a building or parking lot.

Figures 12, 13:
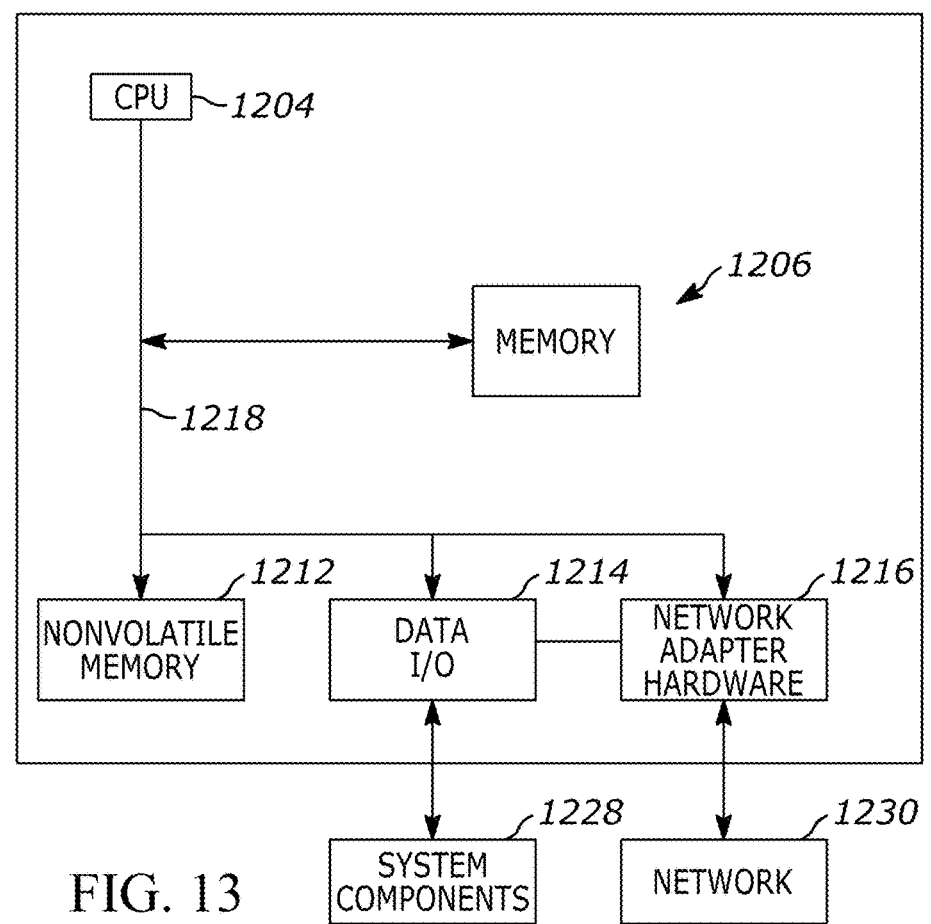
FIG. 12 is a table illustrating alternative land use compatibility examples for common installations.
FIG. 13 illustrates a block diagram illustrating a processor, according to an example.

Turning to the first case in step 1124, procedural modeling is used to generate the energy infrastructure based on the previous insights and calculations performed. The system procedurally generates alternative land uses. The alternative land uses are identified to those that are determined to be compatible with a given installation option. Refer to FIG. 12 is a table illustrating examples of alternative land use compatibility for common installations. The alternative land use modeling is performed with similar layout algorithms as defined above that maximize utility and avoid conflicts with the energy infrastructure. The user can set priorities/weights for the different land uses. The results are rendered in 3D visualizations of alternative land use options with each site layout option. The impacts from alternative land use installations are calculated and presented, including potential revenue, job creation, and environmental impact. The process continues to optional step 1126.

Referring to step 1126, this is the second case of constructing energy infrastructure, which must be compatible with a given structure, such as on top of a building or parking lot, as opposed to the first case, which is building on land. For example, in optional step 1126, the rooftop infrastructure for commercial buildings, residential buildings, and parking lots is procedurally generated. An example is shown in FIG. 10, which illustrates an extended reality image of a selected building at a selected PoV with solar infrastructure illustrating a plurality of points-of-view (PoV) icons as described in step 1122. The process continues to step 1130.

In step 1130 (Overlay relevant Data Visualization), relevant data visualizations are overlayed. For example, 2D and 3D data visualizations can be rendered depending on the purpose of the application being built with this platform. The process continues to step 1132.

In step 1132, one example of data visualization is financial projections: project cost, potential revenue, payback time, ROI, production tax credits, etc. Also, landowner projections may be created for landowners who might be selling or leasing their land to the utility. These landowner projections include how much revenue they will be earning over time, the lease terms, tax benefits, and the effect on property value. Further, regulatory data visualization may be added, such as viewshed analysis and conservation impacts.

Other data visualization methods, including community outreach, are also examples of data visualization in step 1132. Visual and immersive demonstrations of how power generation, storage, and transmission work. Data & storytelling of the benefits of renewable energy and the impact on the environment. Environmental infographics such as $CO_2$ emissions prevented. An equivalent number of cars were taken off the road, trees were planted, etc. Projected job creation. Potential developer investment in local infrastructure. The process continues to steps 1134 through 1142.

In step 1134 (Link), the site is linked to data sources and any calculations performed. Visualization techniques are used in step 1136. Examples of visualization techniques include color mapping, heat maps, spatial data, charts and graphs, and more. Annotation and labeling, such as highlighting the areas of interest, are performed in step 1138. User controls allow users to select and render different visualization options in step 1140. Further, the system allows users to do a side-by-side comparison in step 1142.

As part of step 1140, user selection is received for different types of utility infrastructure, and for receiving a user selection for different types of relevant data, visualizations may be implemented together or, separately or in any combination. For example, other site data is gathered to aid in the optimization of installation costs, environmental impact, land use, and energy production. This includes turbine data, proximity to highways, proximity to and capacity of grid interconnections, proximity to the surrounding population for noise pollution, visual pollution, shadow flicker cast onto dwellings, intersection with protected areas, and more.

Tools already exist, allowing software to be exported to multiple types of platforms. Leverage networked servers that allow users to experience the application in a collaborative session. The process continues to step 1150.

In step 1150 (Generate Interactive Content), the system generates interactive content. User Interface (UI) tools, such as graphical widgets, are provided to enable the user to select among different interactive content in step 1152. In addition, tools are provided to interact with each piece of content, such as adjusting the times of day to visualize the sun and shadows throughout the day. For example, in step 1154, a user selects one of a plurality of graphical widgets that may include time of day and time of year is selected by the user for data visualization. Adjusting the time to visualize sun and shadows throughout the day, how they interact with the infrastructure, and how they affect the data visualizations calculated in 1130.

Generative interactive content may further include the construction of infrastructure over a period of time. Scenario Modeling: Including tools for users to configure variables or conditions and observe their effects in real-time. These can allow users to explore financial, operational, environmental, risk, and other outcomes. Simulations of events and situations, such as weather conditions or sunlight as it moves throughout the day, explore solar panel efficiency and the effects of shading. Analytics and measurement: analytic tools such as distance measurement, elevation profiling, solar irradiance calculators, and more. Augmented Reality (AR) Overlays: in the event that the user is using an augmented reality tool, they can overlay the proposed infrastructure onto real-world views of the provided location. Narratives and tours: guided tours and narratives through the generated virtual environment, highlighting significant features and concepts depending on the nature of the content and user. The process continues to step 1160.

In step 1160 (Export for XR), relevant data visualization is the export for XR (extended Reality). Export this packaged platform to a format that is compatible with the desired XR platform. XR platforms include traditional computers, web applications, mobile device applications, virtual reality headsets, and augmented reality devices. Tools already exist, allowing software to be exported to multiple types of platforms. Step 1162, networked servers are leveraged to allow users to experience the application in a collaborative session. The process continues to step 1170 and ends.

Information Processing System

The present subject matter can be realized in hardware, software, or a combination of hardware and software. A system can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

The present subject matter can also be embedded in a computer program product, which comprises all the features enabling the implementation of the methods described herein and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer-readable medium allowing a computer to read data, instructions, messages or message packets, and other computer-readable information from the computer-readable medium. The computer-readable medium may include computer-readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer-readable medium may comprise computer-readable information in a transitory state medium such as a network link and/or a network interface, including a wired network or a wireless network, that allows a computer to read such computer-readable information. In general, the computer-readable medium embodies a computer program product as a computer-readable storage medium that embodies computer-readable program code with instructions to control a machine to perform the above-described methods and realize the above-described systems.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

INCORPORATED REFERENCES

The following publications are each incorporated by reference in their entirety and listed in the Information Disclosure:

Solar Farm Layout Optimization:

Bieganek et al. (2022) Solar farm design system (U.S. Pat. No. 11,494,530 B2). U.S. Patent and Trademark Office. <https://patentimages.storage.googleapis.com/f9/42/5b/9aa49ad8dac543/US11494530.pdf>

Wind Farm Location and Site Optimization

Grzych et al. (2007) System and method for enhanced measure-correlate-predict for a wind farm location (U.S. Pat. No. 7,228,235 B2). U.S. Patent and Trademark Office. <https://patentimages.storage.googleapis.com/16/6e/1c/aa0ff3cdb215a9/US7228235.pdf>

Dhoot, Aditya & Antonini, Enrico G. A. & Romero, David A. & Amon, Cristina H., 2021. "Optimizing wind farms layouts for maximum energy production using probabilistic inference: Benchmarking reveals superior computational efficiency and scalability," Energy, Elsevier, vol. 223 (C). <https://arxiv.org/pdf/2102.08479.pdf>

What is claimed is:

1. A computer-implemented method for performing an interactive property use assessment, the method comprising:
accessing at least one image of a real-world space with an associated property owner;
receiving input from a user to select one or more pieces of infrastructure equipment to be rendered in the real-world space;
accessing at least one image of the one or more pieces of infrastructure equipment;
creating a virtual reality image by combining i) the image of real-world space with ii) the image of the one or more pieces of infrastructure equipment;
calculating at least one financial value to offer the property owner based on the one or more pieces of infrastructure equipment shown in the virtual reality image;
receiving a user selection of one of a plurality of graphical widgets; and

in response to receiving the user selection of one of the plurality of graphical widgets, presenting to the user the virtual reality image with the financial value that has been calculated.

2. The method of claim 1, wherein the accessing at least one image of the real-world space includes accessing at least one of a real-world image, a virtual image, and a combination thereof.

3. The method of claim 1, wherein the accessing of the image of the real-world space includes accessing one of a 2-D image, a 3-D image from LiDAR, photogrammetry stitching, or generation of a point cloud.

4. The method of claim 1, wherein the financial value that has been calculated is a lease value to offer the property owner, a purchase value to offer the property owner or both.

5. The method of claim 1, wherein the graphical widget further includes selecting a time of day and a date and calculating a position of the sun to present as part of the graphical widget to include shadows.

6. The method of claim 1, further comprising:
presenting to the user a plurality of graphical widgets, where each of the graphical widgets represents a type of electricity generation technology;
selecting by the user at least one of the plurality of graphical widgets, the type of electricity generation technology; and
wherein the graphical widget further includes presenting the type of electricity generation technology selected.

7. The method of claim 6, further comprising:
presenting to the user a plurality of graphical widgets, where each of the graphical widgets represents a type of "geographic information system (GIS) data;
selecting by the user at least one of the plurality of graphical widgets, the type of GIS data; and
wherein the graphical widget further includes presenting the type of GIS data selected.

8. The method of claim 1, wherein the presenting to the user the virtual reality image from the graphical widget further includes:
generating audio associated with the one or more pieces of infrastructure equipment is operating in which the audio has been spatially matched to the graphical widget to account for a distance from the one or more pieces of infrastructure equipment; and
presenting to the user the audio that has been generated.

9. The method of claim 8, wherein the one or more pieces of infrastructure equipment is a wind turbine with blades turning due to wind.

10. The method of claim 9, wherein the generating audio further comprises generating audio associated with the operating of the one or more pieces of infrastructure equipment in which the audio has been spatially matched to the point of view to account for one or more objects between the one or more pieces of infrastructure equipment and the graphical widget.

11. The method of claim 10, wherein the one or more objects between the one or more pieces of infrastructure equipment and the graphical widget are trees, walls of structures, and property details.

12. The method of claim 8, wherein the generating audio further comprises generating audio associated with the operating of the infrastructure equipment in which the audio has been spatially matched to a time of day, a time of year, a temperature, a humidity, or a combination thereof.

13. A system for performing an interactive property use assessment, the system comprising:

a computer memory capable of storing machine instructions; and a hardware processor in communication with the computer memory, the hardware processor configured to access the computer memory to execute the machine instructions for performing:

accessing at least one image of a real-world space with an associated property owner;

receiving input from a user to select one or more pieces of infrastructure equipment to be rendered in the real-world space;

accessing at least one image of the one or more pieces of infrastructure equipment;

creating a virtual reality image by combining i) the image of real-world space with ii) the image of the one or more pieces of infrastructure equipment;

calculating at least one financial value to offer the property owner based on the one or more pieces of infrastructure equipment shown in the virtual reality image;

receiving a user selection of one of a plurality of graphical widgets; and in response to receiving the user selection of one of the plurality of graphical widgets, presenting to the user the virtual reality image along with the financial value that has been calculated.

14. The system of claim 13, wherein the accessing at least one image of the real-world space includes accessing at least one of a real-world image, a virtual image, and a combination thereof.

15. The system of claim 13, wherein the accessing of the image of the real-world space includes accessing one of a 2-D image, a 3-D image from LiDAR, photogrammetry stitching, or generation of a point cloud.

16. The system of claim 13, wherein the financial value that has been calculated is a lease value to offer the property owner, a purchase value to offer the property owner or both.

17. The system of claim 13, wherein the graphical widget further includes selecting a time of day and a date and calculating a position of the sun to present as part of the graphical widget to include shadows.

18. The system of claim 13, further comprising:

presenting to the user a plurality of graphical widgets, where each of the graphical widgets represents a type of electricity generation technology;

selecting by the user at least one of the plurality of graphical widgets, the type of electricity generation technology; and wherein the graphical widget further includes presenting the type of electricity generation technology selected.

19. The system of claim 18, further comprising:

presenting to the user a plurality of graphical widgets, where each of the graphical widgets represents a type of "geographic information system (GIS) data;

selecting by the user at least one of the plurality of graphical widgets, the type of GIS data; and wherein the graphical widget further includes presenting the type of GIS data selected.

20. The system of claim 13, wherein the presenting to the user the virtual reality image from the graphical widget further includes:

generating audio associated with the one or more pieces of infrastructure equipment is operating in which the audio has been spatially matched to the graphical widget to account for a distance from the one or more pieces of infrastructure equipment; and presenting to the user the audio that has been generated.

* * * * *